(12) United States Patent
Bryant

(10) Patent No.: US 10,154,630 B2
(45) Date of Patent: Dec. 18, 2018

(54) SELF-CONTAINED PLANT WATERING APPARATUS SYSTEM

(71) Applicant: Randy Bryant, Auburn, CA (US)

(72) Inventor: Randy Bryant, Auburn, CA (US)

( * ) Notice: Subject to any disclaimer, the term of this patent is extended or adjusted under 35 U.S.C. 154(b) by 179 days.

(21) Appl. No.: 15/046,227

(22) Filed: Feb. 17, 2016

(65) Prior Publication Data

US 2017/0231173 A1  Aug. 17, 2017

(51) Int. Cl.
*A01G 9/02* (2018.01)
*A01G 9/12* (2006.01)
*A01G 27/00* (2006.01)

(52) U.S. Cl.
CPC .......... *A01G 27/008* (2013.01); *A01G 9/024* (2013.01); *A01G 9/12* (2013.01); *A01G 9/025* (2013.01)

(58) Field of Classification Search
CPC .......... A01G 9/024; A01G 9/025; A01G 9/12; A01G 27/00; A01G 27/005; A01G 27/006; A01G 27/008; A01G 27/02; A01G 27/04; A01G 27/06
USPC .......... 47/39, 44, 46, 48.5, 66.7, 79
See application file for complete search history.

(56) References Cited

U.S. PATENT DOCUMENTS

| 1,538,081 A * | 5/1925 | Bank | A47G 7/045 47/67 |
|---|---|---|---|
| 3,015,024 A * | 12/1961 | Charchan | A01G 9/12 174/38 |
| 4,760,666 A * | 8/1988 | Han | A01G 27/003 47/67 |
| 4,951,416 A * | 8/1990 | Gutridge | A01G 31/02 47/39 |
| 5,411,562 A * | 5/1995 | Saparzadeh | A01G 27/00 47/4 |
| 5,806,239 A * | 9/1998 | Wesolowski | A01G 27/005 47/39 |
| 6,247,266 B1 * | 6/2001 | Borgen | A01G 27/00 47/58.1 R |
| 6,843,022 B1 * | 1/2005 | Holley | A47G 7/041 47/39 |
| 8,756,860 B1 * | 6/2014 | Murphy | A47G 7/042 47/47 |
| 2002/0189163 A1 * | 12/2002 | Cooper | A01G 27/005 47/39 |
| 2005/0081441 A1 * | 4/2005 | Mantovani | A01G 9/024 47/67 |
| 2007/0084114 A1 * | 4/2007 | Simmons | A01G 27/005 47/82 |
| 2007/0101645 A1 * | 5/2007 | Christopher | A01G 27/006 47/67 |
| 2010/0037517 A1 * | 2/2010 | Copping | A01G 9/022 47/79 |

(Continued)

*Primary Examiner* — Joshua E Rodden

(57) ABSTRACT

The object of the present invention to provide an improved plant watering system which can be easily hooked up and provides a regulated flow of water to any type of plant. It is another object of the present invention to provide an improved watering apparatus, which can be easily hooked up to any type of irrigation system available, and keep the planter and/or plant hanger from corrosion and wear by keeping the water in a flexible hose threaded through the wood post and/or steel tubing structure. It is a further object of the present invention to provide an improved watering apparatus, which is simple and inexpensive in construction, which can be used indoor or outdoor for growing and displaying plants.

4 Claims, 17 Drawing Sheets

(56) References Cited

U.S. PATENT DOCUMENTS

| | | | |
|---|---|---|---|
| 2012/0066972 A1* | 3/2012 | Lin | A01G 9/024 47/82 |
| 2013/0145690 A1* | 6/2013 | Cannon | A01G 9/023 47/66.7 |
| 2014/0109473 A1* | 4/2014 | Sung | A01G 9/025 47/39 |
| 2016/0113211 A1* | 4/2016 | MacKenzie | A01G 9/025 47/79 |

* cited by examiner

SELF-CONTAINED PLANT WATERING APPARATUS SYSTEM

FIELD OF THE INVENTION

The present invention may relate to self-contain plant watering method and apparatus systems. More specifically, the present invention may related to self-contain plant watering method and apparatus depicted in a shepherd's hook, whiskey barrel planter, wood post planter and trellis garden planter for the purpose of watering plants on a regulator bases while keeping the apparatus attractiveness in tack.

BACKGROUND OF THE INVENTION

One of the ways to keep the planters and plant hangers looking beautiful and at the same time keeping the plant from wilting or dying is by watering them regularly. Hanging plant and/or planters typically need to be water more often and in smaller amounts than those planted in the ground. Many people whom water their plants do so using a hose, water container or by installing, an irrigation system designed to deliver water to the plant outside the solid structure. This process can be time consuming, messy and physically strenuous.

An additional problem with patented devices for watering planters and/or plant hangers is the introduction of another object taking away the natural color and beauty of the plant. Moreover, these devices are relatively complex, costly, and unsightly. There are many type of planters and plant hangers available without any internal self-contained water system in turn relies on external watering which can be missy and unattractive. While these planter and/or plant hangers might look beautiful adding an irrigation tubing to the outside of the hanger can only take away the beauty and open them up to suffer numerous deficiencies and disadvantages.

Most basic plant hangers are handmade and welded strong ½" solid square steel that are easy installed and design to hold up to a 14 in hanging basket but doesn't come with an internal watering system. As for planters, there is only drip irrigation system and/or hand water available for watering.

SUMMARY OF THE INVENTION

It is an object of the present invention to provide an improved plant watering system which can be easily hook up and provide a regulator flow of water to any type of plant. Therefore, it is the object of the present invention to provide a decorative planter and/or plant hangers visually free other watering devices.

The self-contain watering network system has a number of important features and advantages. Its no-drip design also uses non-breakable hose and heavy duty barred fitting for long lasting performance for variety of application display in your home, garden or yard.

It is another object of the present invention to provide an improved watering apparatus, which can be easily hookup to any type of irrigation system available, keep the planter and/or plant hanger from corrosion and wear by keeping the water in a self-contained watering apparatus within the planter and/or plant hanger structure.

It is a further object of the present invention to provide an improved watering apparatus, which is simple and inexpensive in construction, which can be used indoor or outdoor for growing and displaying plants.

Other features and advantages of the present invention will become apparent from the following more detailed description, taken in conjunction with the accompanying drawings, Which illustrate, by way of example, the principles of the presently described apparatus and method of its use.

The greatest benefit of any type of planter and/or plant hangers is that they will last a lifetime and look beautiful while holding your plants. While these planter and/or plant hangers might look beautiful adding an irrigation tubing to the outside of the hanger can only take away the beauty and open them up to suffer numerous deficiencies and disadvantages. The present invention overcomes these deficiencies and disadvantages in that it provides a new and improved watering system within the plant hanger structure keeping the overall look and functionality of water the plants without any of the problem of manual watering.

DETAILED DESCRIPTION OF THE PREFERRED EMBODIMENTS

Figure 1:
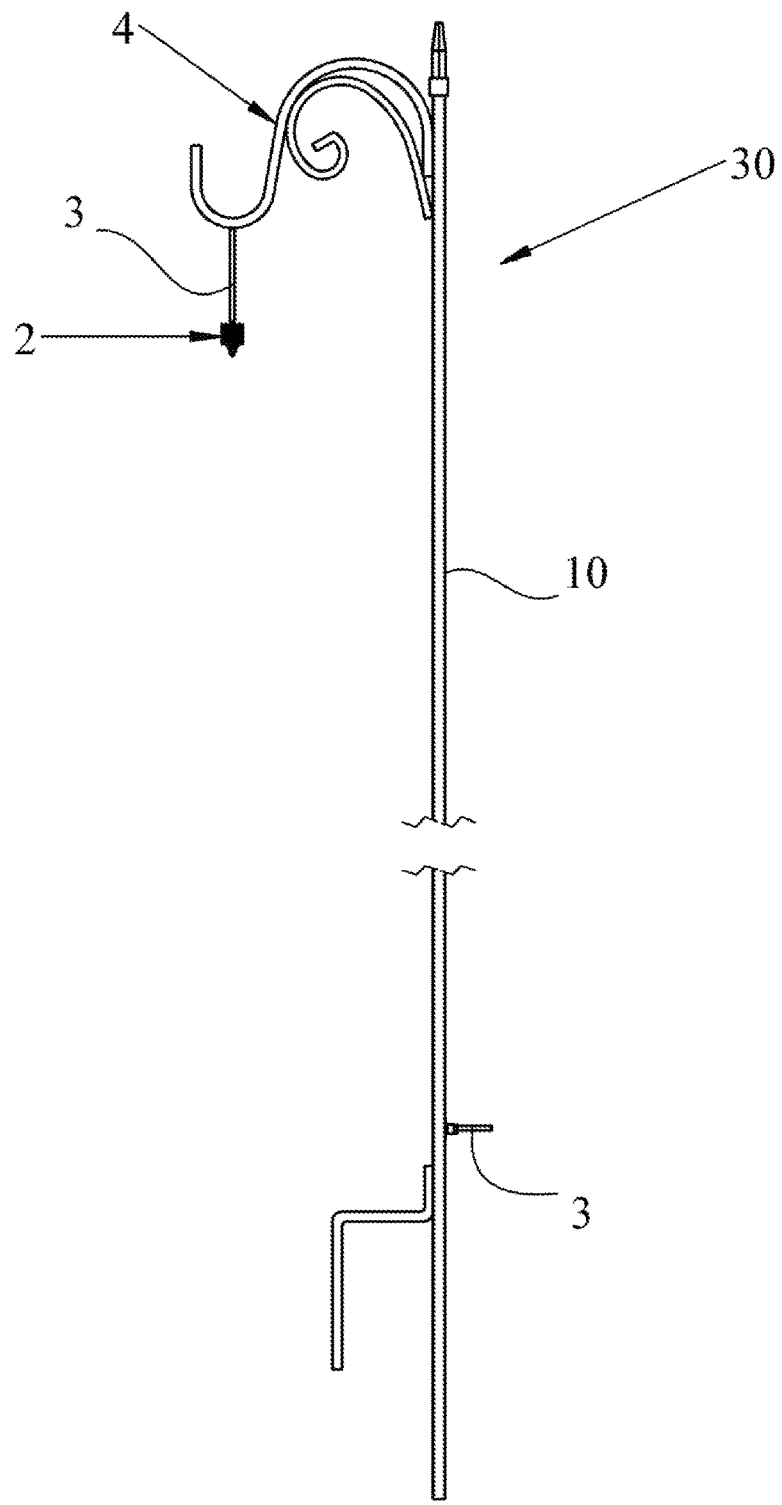
FIG. 1 is substantially a perspective view of a fully assembled self-contain plant watering apparatus depicted in a shepherd hook, of the present invention.

In the following detailed description of the preferred embodiment, reference is made to the accompanying drawings, which form a part of this application. The drawing show, by way of illustration, specific embodiments in which the invention may be practiced. It is to be understood that other embodiments may be utilized and structural changes may be made without departing from the scope of the present invention.

The present invention could comprise a self-contain watering network 30 depicted in a shepherd hooks (10), whiskey barrel planter (17), wood post planter (20) and trellis garden planter (28) for its operation that can consistently and uniformly water indoor and outdoor plants.

Figure 2:
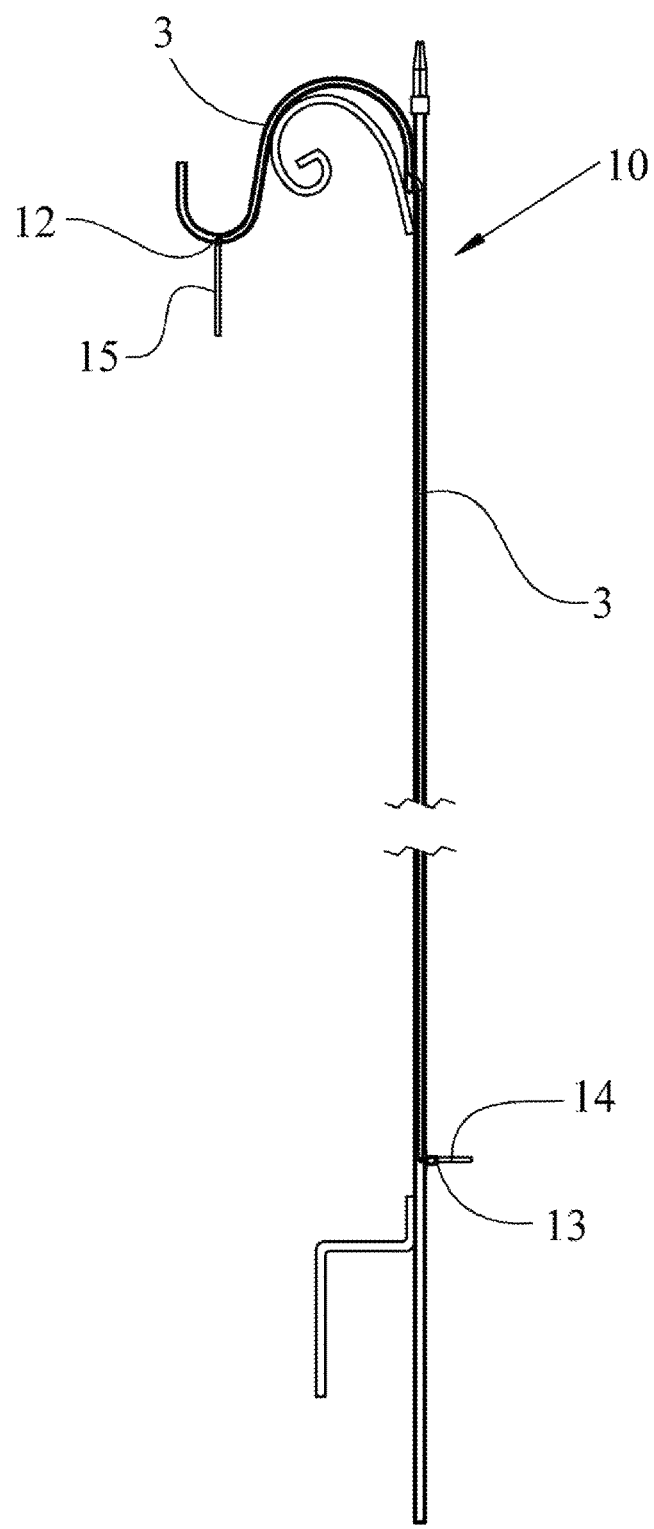
FIG. 2 is a cut-a-way view of the self-contain plant watering apparatus depicted in a shepherd hook, according to a preferred embodiment of the invention.
Figure 3:
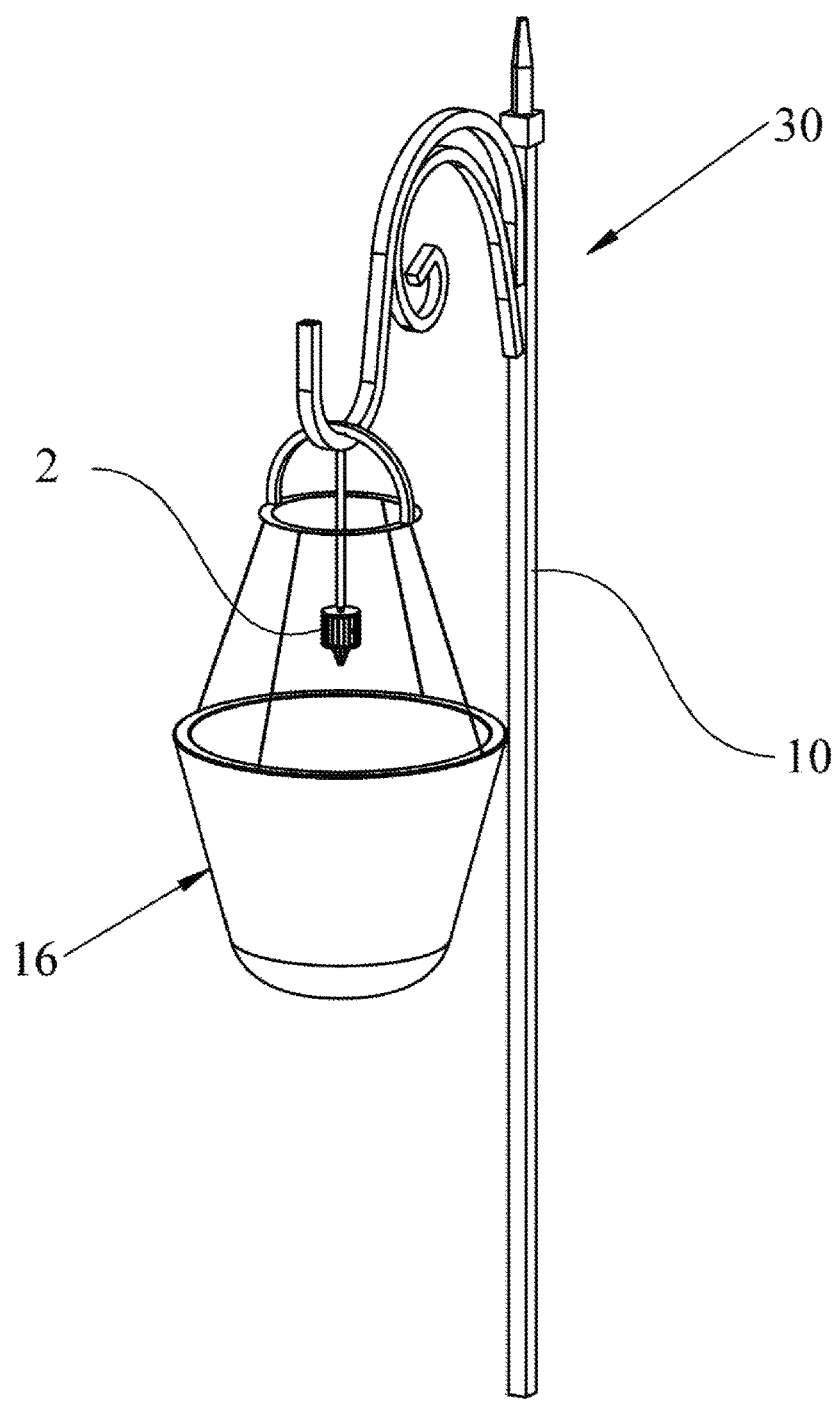
FIG. 3 is a close-up perspective view of an upper portion of self-contain plant watering apparatus depicted in a shepherd hook, supporting a container holding a plant being watered by a drip irrigation emitter.
Figure 4:
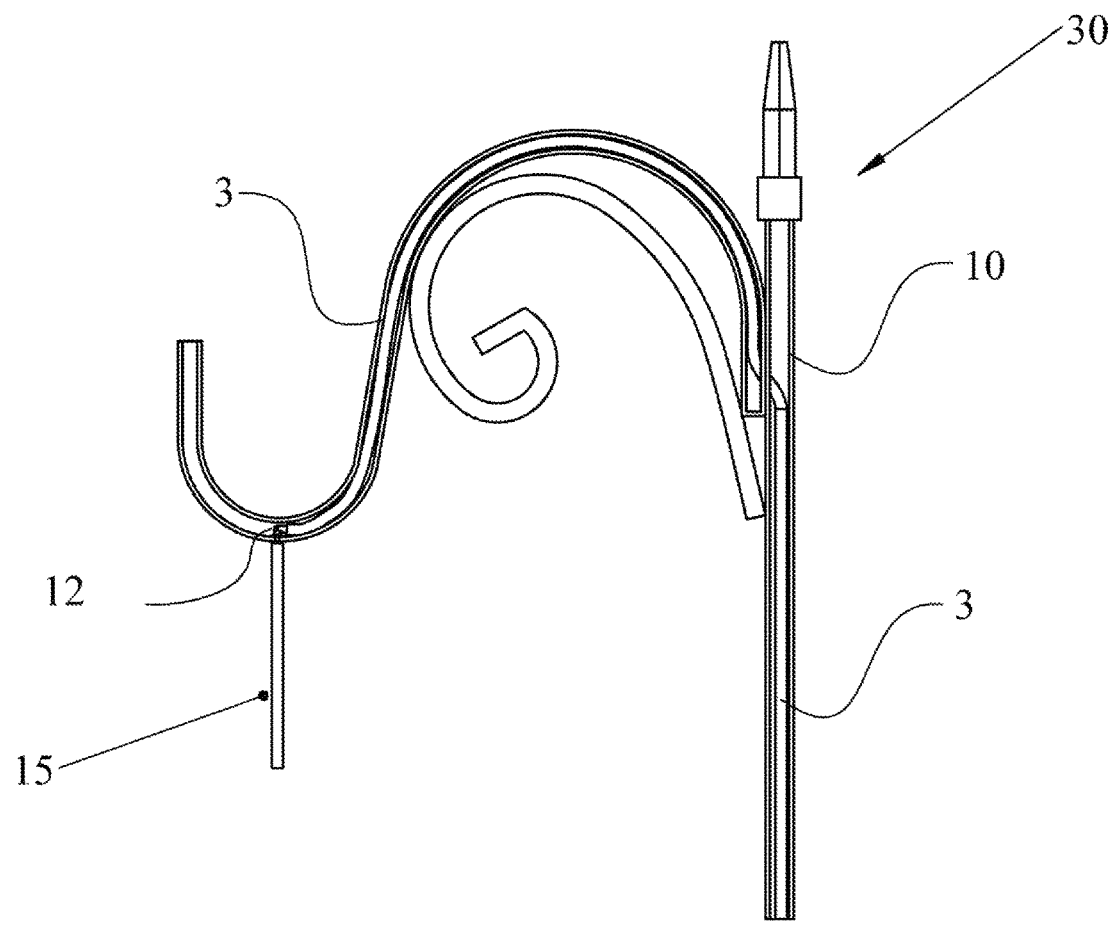
FIG. 4 is a close up sectional view of the upper portion of the self-contain plant watering apparatus depicted in a shepherd hook, of the present invention.
Figure 5:
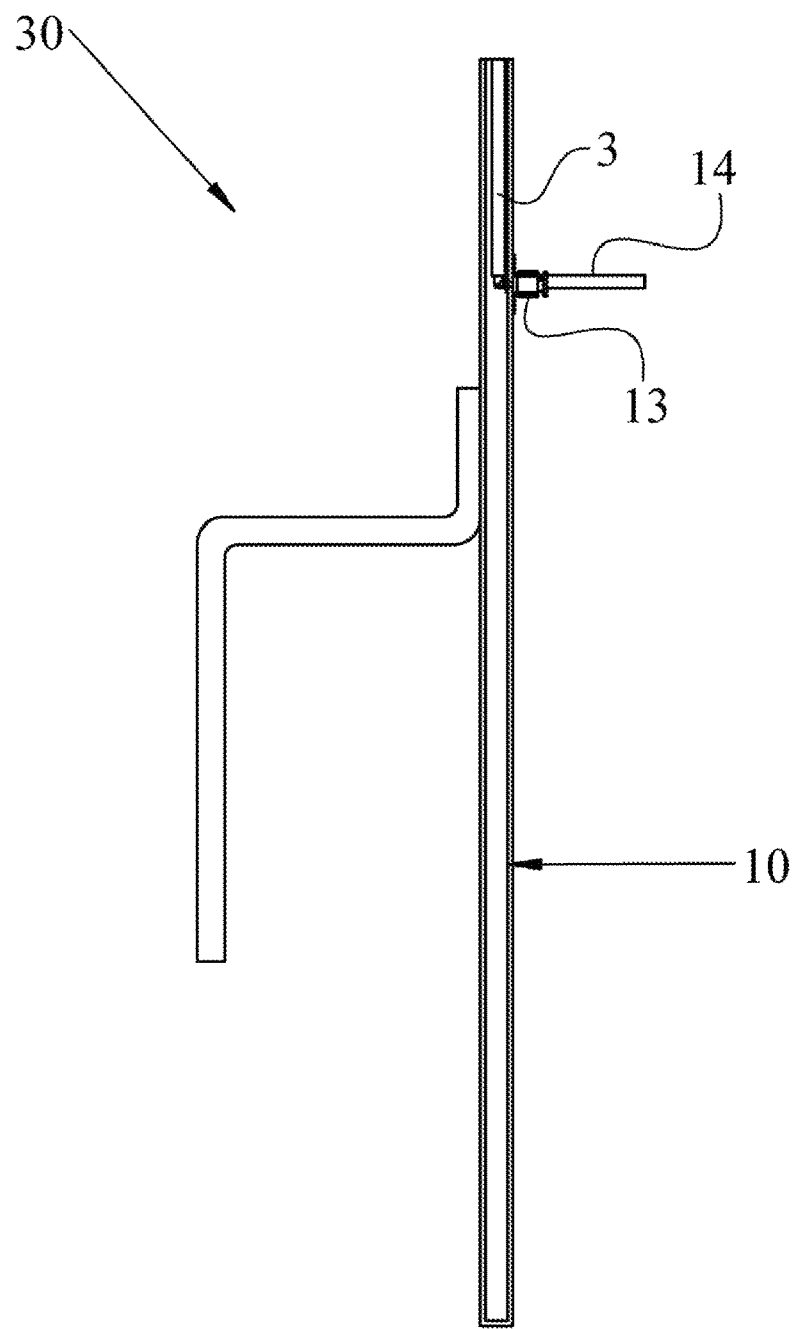
FIG. 5 is a close up sectional view of the lower portion of the self-contain plant watering apparatus depicted in a shepherd hook, of the present invention.
Figure 6:
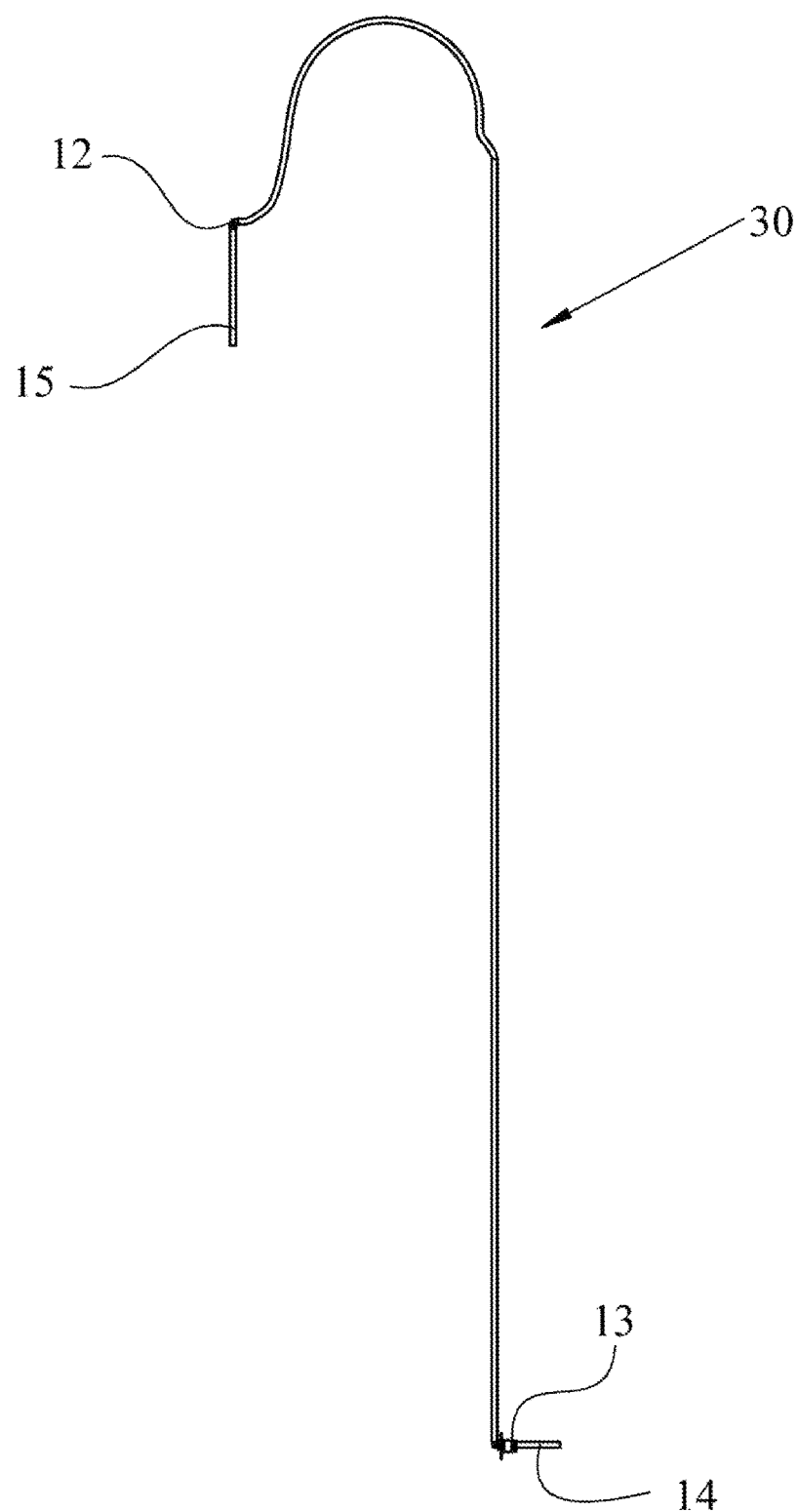
FIG. 6 is a perspective view of the self-contain plant watering apparatus system according to the preferred embodiment in accordance with the invention.
Figure 7:
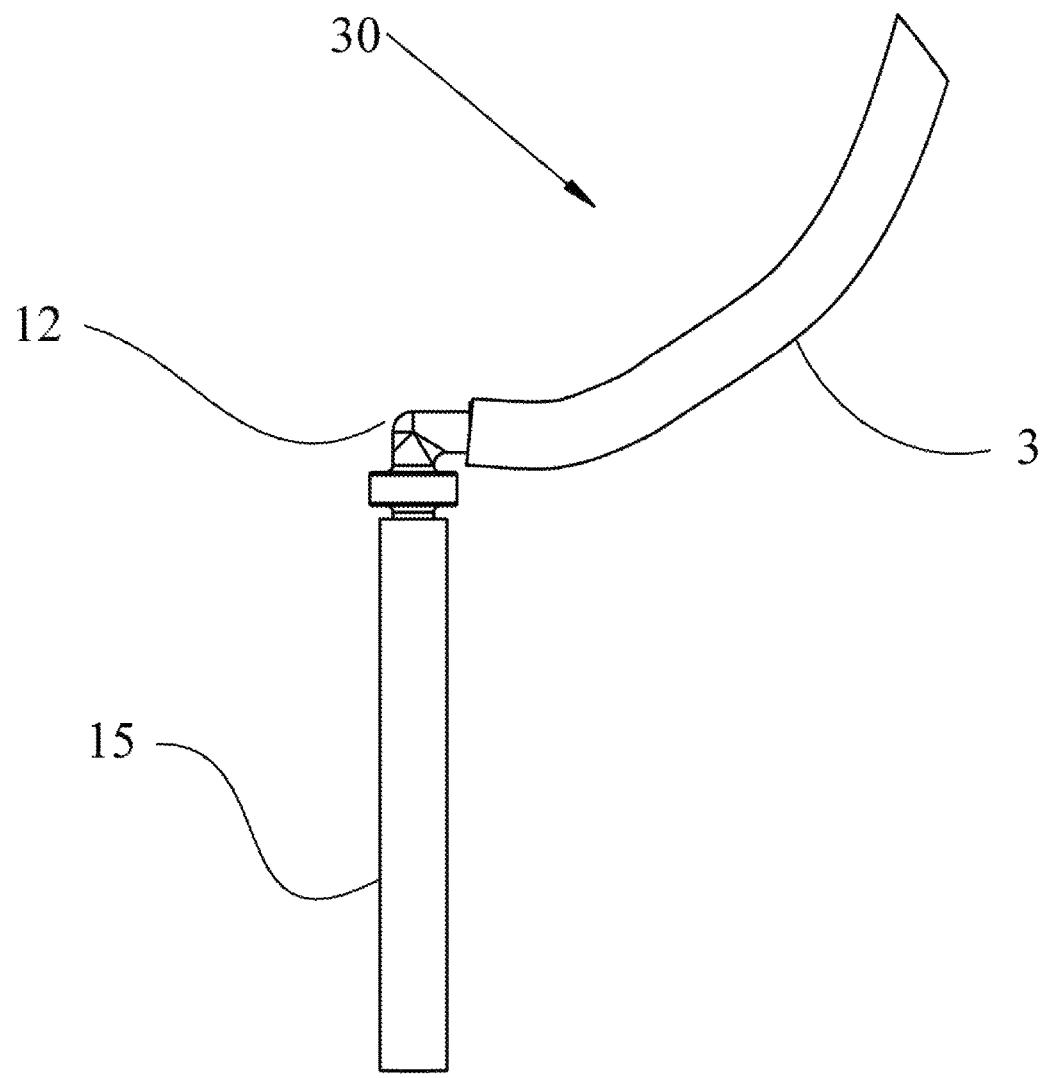
FIG. 7 is a close up sectional view of the upper portion of the self-contain plant watering apparatus main water line connected by a fitting on one ends of the present invention.

As generally shown in FIG. 1, such a self-contain watering network system 30 depicted in a shepherd hook (10) could comprise of a plant hanger (4), main network tube (3) and a water emitter (2). As substantially shown in FIG. 2, a cut-a-way view of the main tube (3) within the shepherd hook (10) connect to the barbed fitting (12) and the disconnect fitting (13) and the connection of the barbed fitting (12) to the dripping tube (15), the connection of the quick disconnect fitting (13) to the feeding tube (14). As best seen in FIG. 3, an close-up perspective view of an upper portion of plant hanger's self-contain watering network (30) depicted in a shepherd hook (10), supporting a container holding a plant holder (16) being watered by a water emitter (2). As substantially shown in FIG. 4, an enlarged sectional view of the upper portion of the plant hanger's self-contain watering network (30) shown within the shepherd hook (10), could comprise of a main network tube (3), connected to a drip irrigation system by a barbed fitting (12) into a dripping tube (15). As substantially shown in FIG. 5, is an enlarged sectional view of the lower portion of the plant hanger's self-contain watering network (30) shown within the shepherd hook (10), could comprise of a main tube (3), connected to a drip irrigation system by a quick disconnect fitting (13) into the feeding tube (14). As substantially shown in FIG. 6, is an perspective view of the self-contain watering network apparatus (30) without the shepherd hook, including the main network tubing (3), a barbed fitting (12), a quick disconnect fitting (13), a feeding tube (14), and a dripping tube (15). As substantially shown in FIG. 7, is a close up sectional view of the upper portion of the self-contain watering network apparatus (30) a main water network tube (3) being connected by a barbed fitting (12), into a dripping tube (15).

Figure 8:
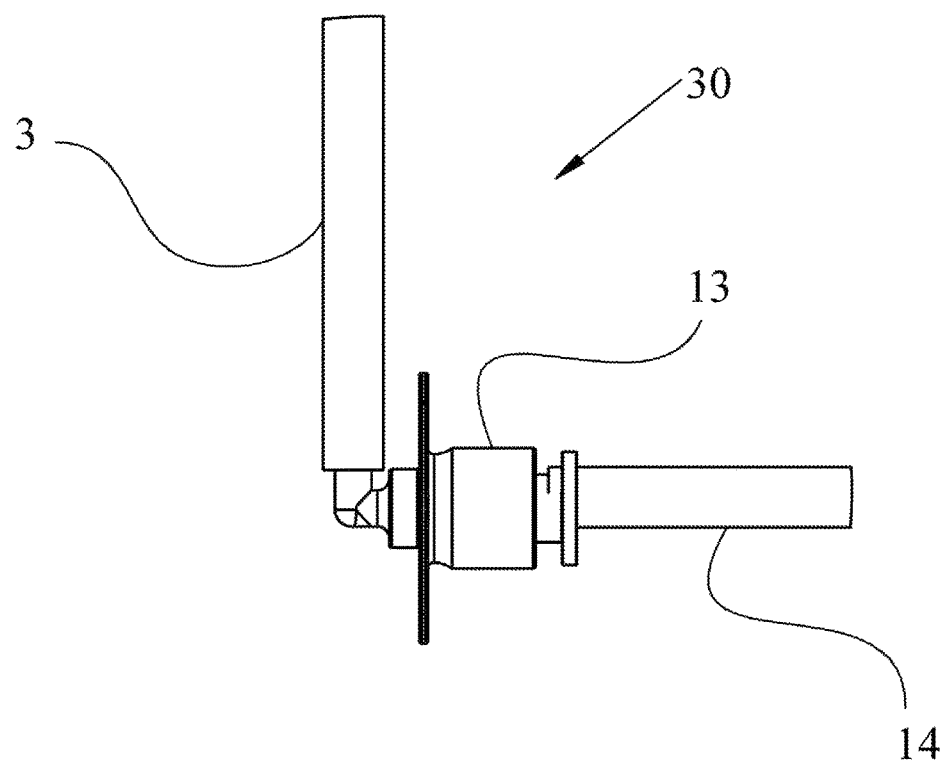
FIG. 8 is a close up sectional view of the lower portion of the self-contain plant watering apparatus main water line connected by a fitting on one ends of the present invention.
Figure 9:
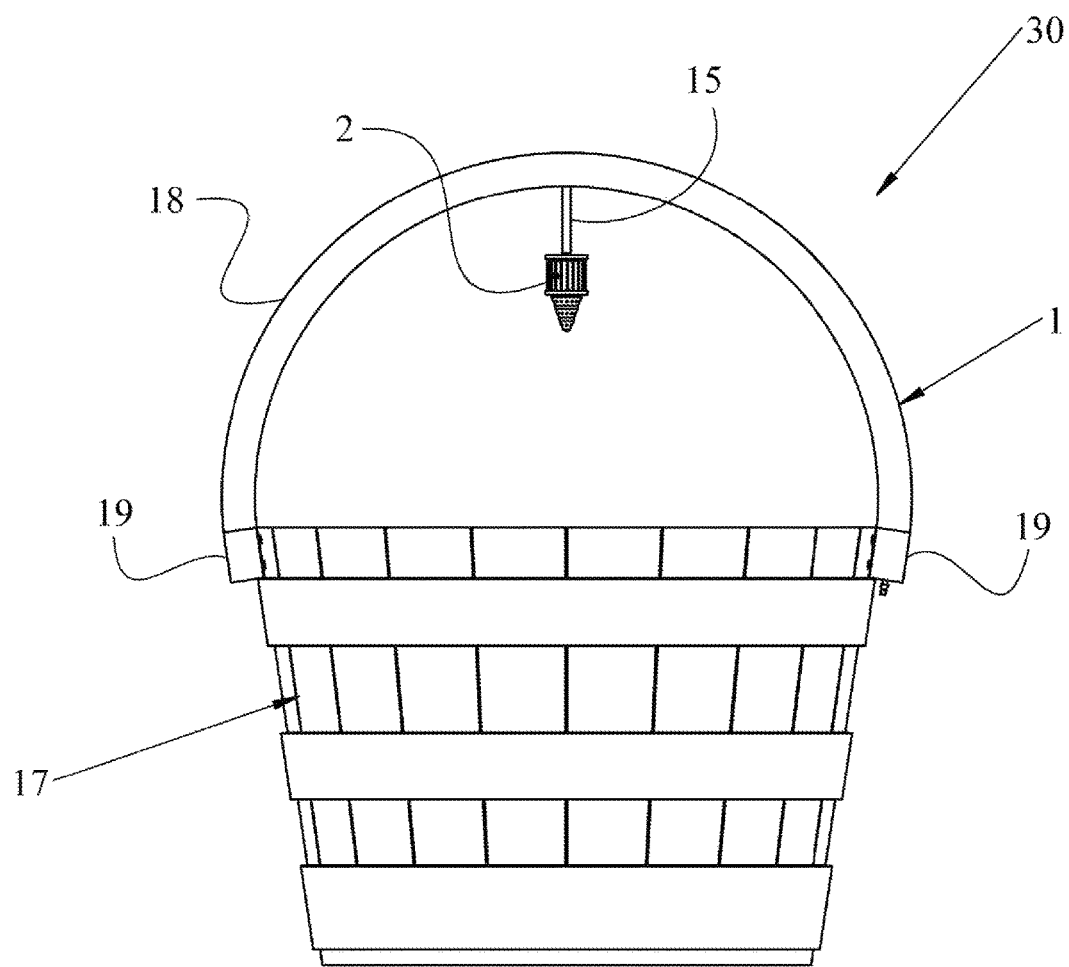
FIG. 9 is substantially a perspective view of a fully assembled self-contain plant watering apparatus depicted in a whiskey barrel planter, of the present invention.
Figure 10:
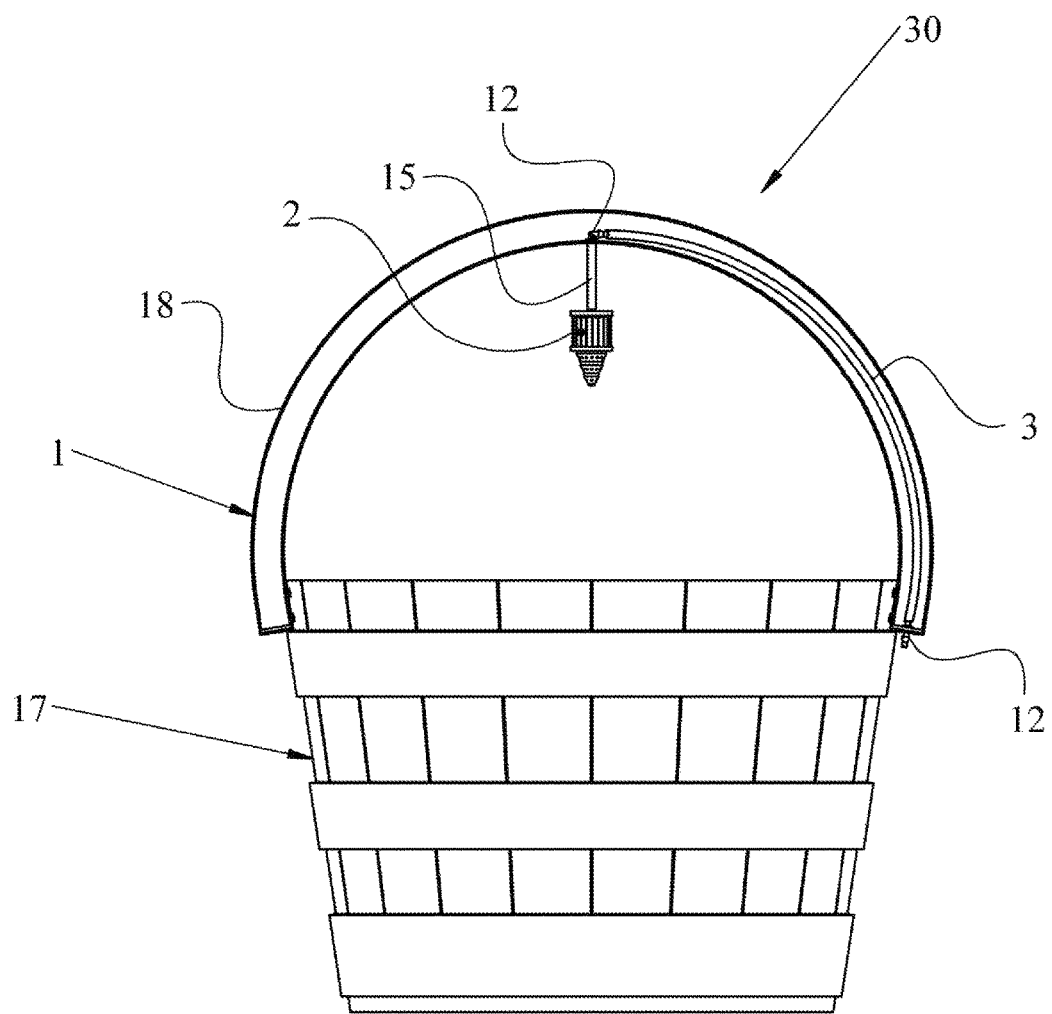
FIG. 10 is a cut-a-way view of the self-contain plant watering apparatus depicted in a whiskey barrel planter, according to a preferred embodiment of the invention.
Figure 11:
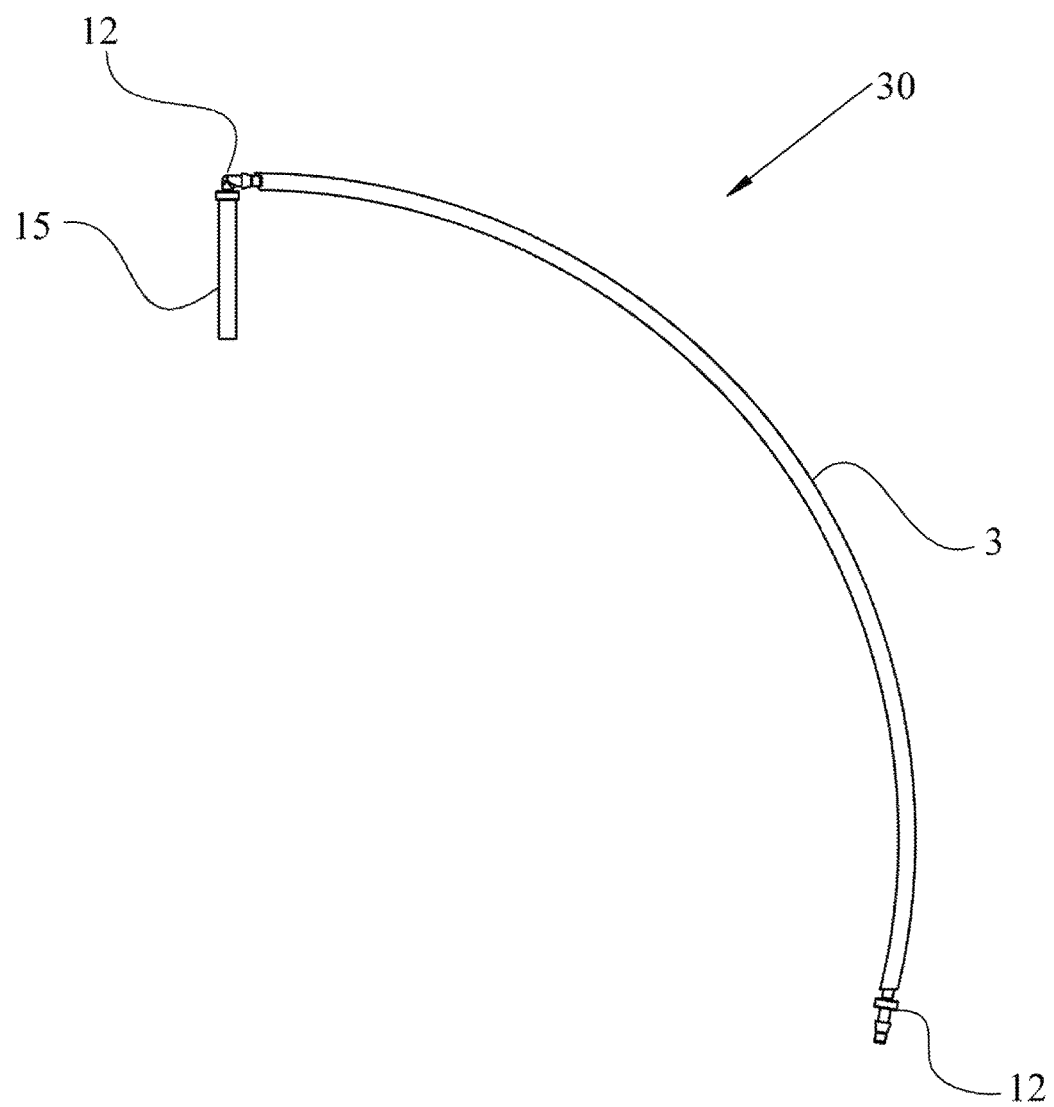
FIG. 11 is a perspective view of the self-contain plant watering apparatus system according to the preferred embodiment in accordance with the invention.
Figure 12:
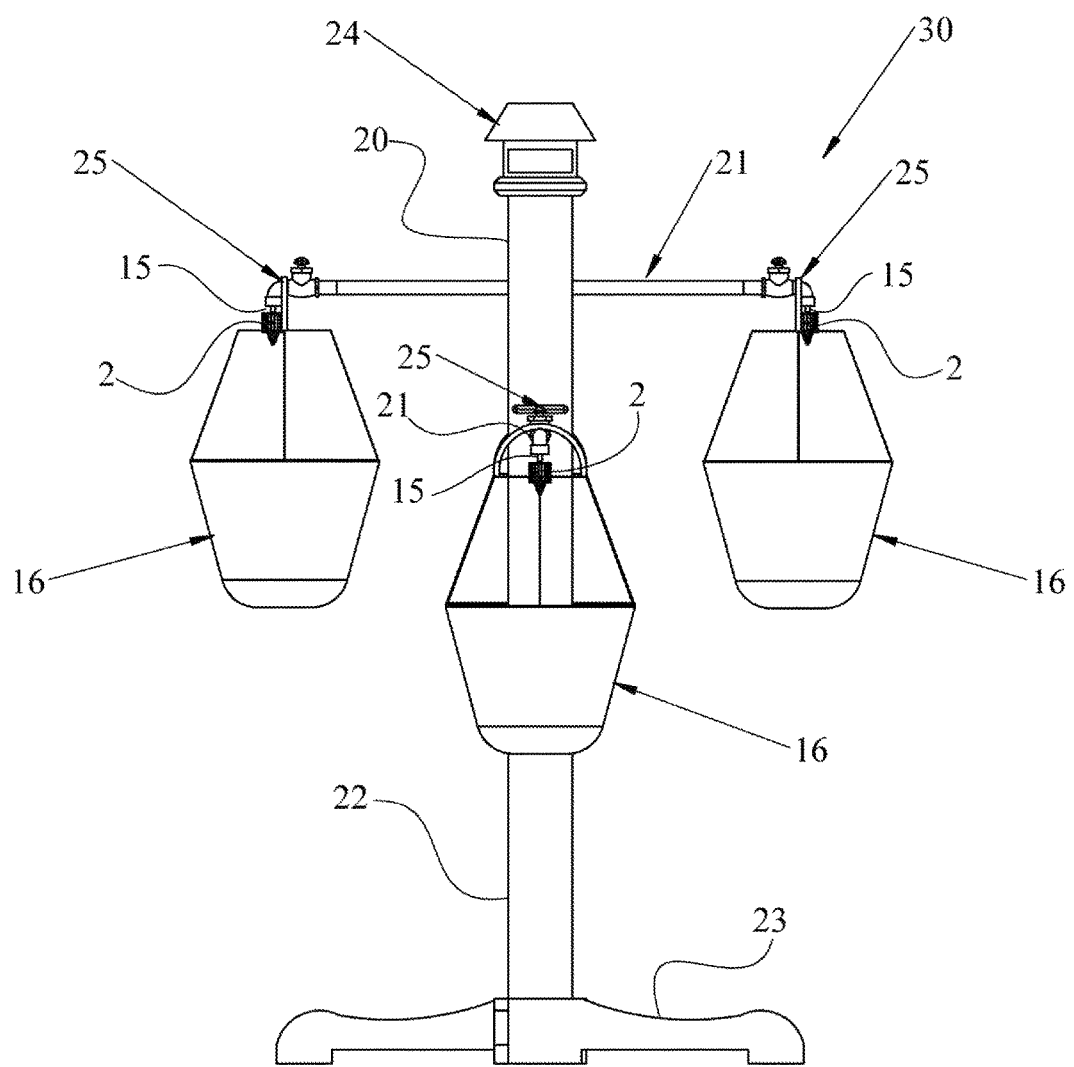
FIG. 12 is substantially a perspective view of a fully assembled self-contain plant watering apparatus depicted in a wood post planter, of the present invention.

As substantially shown in FIG. 8, is a close up sectional view of the lower portion of the self-contain watering network apparatus (30) a main water network tube (3) being connected by a quick disconnect fitting (13), into a feeding tube (14). As generally shown in FIG. 9, such a self-contain watering network system 30 depicted in a whiskey barrel planter (1) includes an square steel tubing (18), a square steel support (19) and could comprise of a planter/whiskey barrel (17), drip tube (15) and a water emitter (2). As substantially shown in FIG. 10, and referring to FIG. 9 a cut-a-way view of the main tube (3) within the whiskey barrel square steel tubing (18) connect to the barbed fitting (12) and the connection of the barbed fitting (12) to the drip tube (15). Also includes the connection of drip tube (15) to the water emitter (2) located above the whiskey barrel (17). As substantially shown in FIG. 11, is an perspective view of the self-contain watering network apparatus (30) without the whiskey barrel planter, including the main network tubing (3), two barbed fitting (12), and a drip tube (15). As generally shown in FIG. 12, such a self-contain watering network system 30 depicted in a wood post planter (20) shown with plant holder (16), a water faucet (25), a water emitter (2) connected to a drip tube (15). Also includes a wood post structure (22), a wood post legs support (23), wood post cap (24), brass tubing (21).

Figure 13:
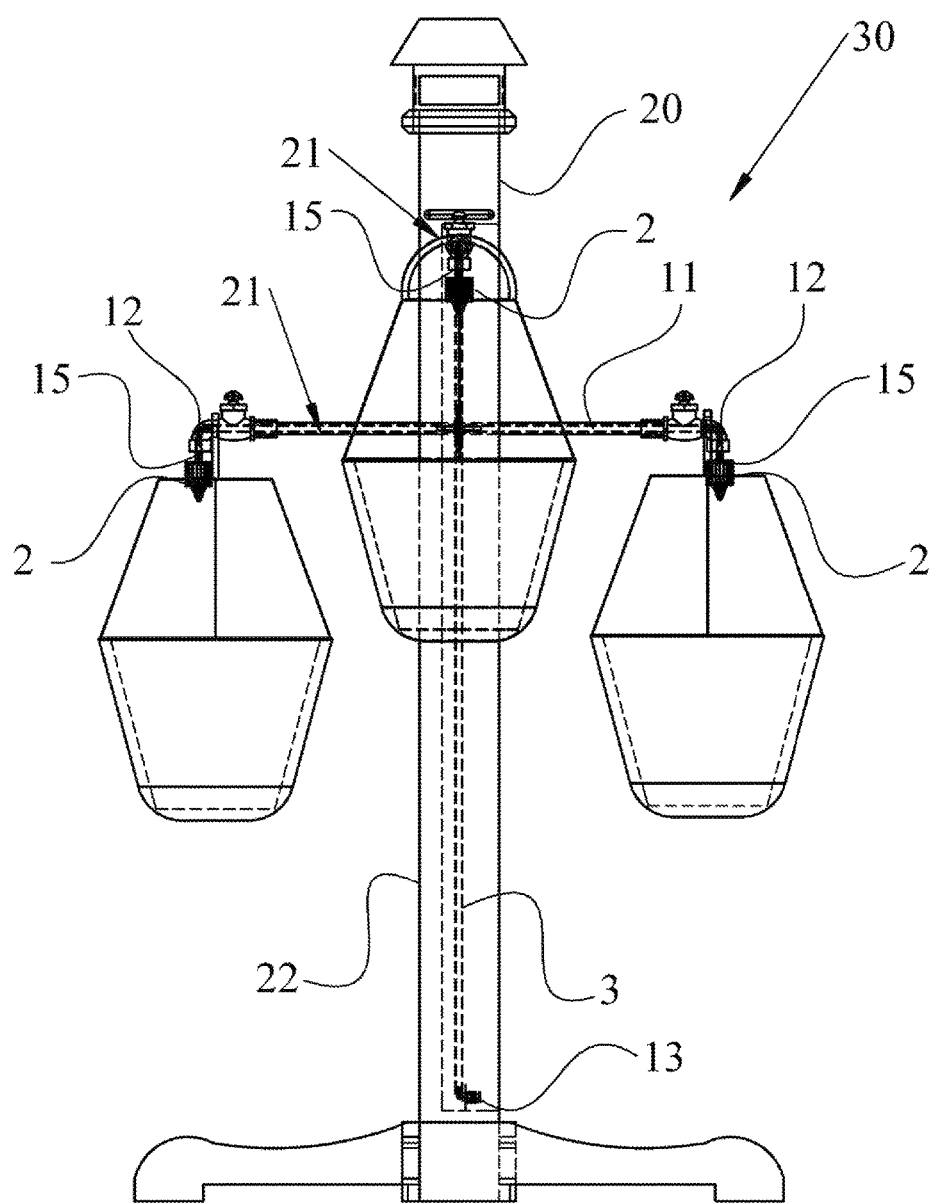
FIG. 13 is a cut-a-way view of the self-contain plant watering apparatus depicted in a wood post planter, according to a preferred embodiment of the invention.
Figure 14:
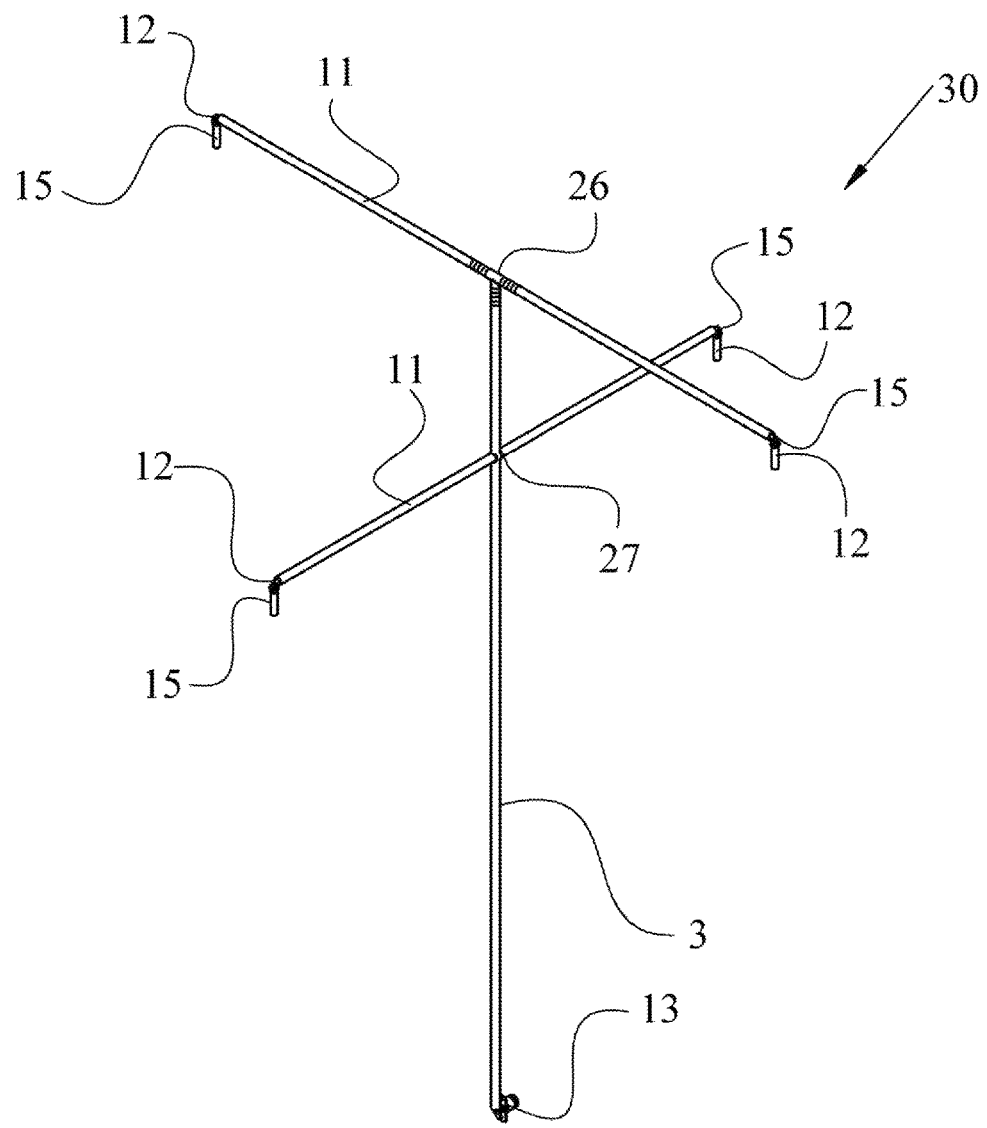
FIG. 14 is an isometric view of the self-contain plant watering apparatus system according to the preferred embodiment in accordance with the invention.
Figure 15:
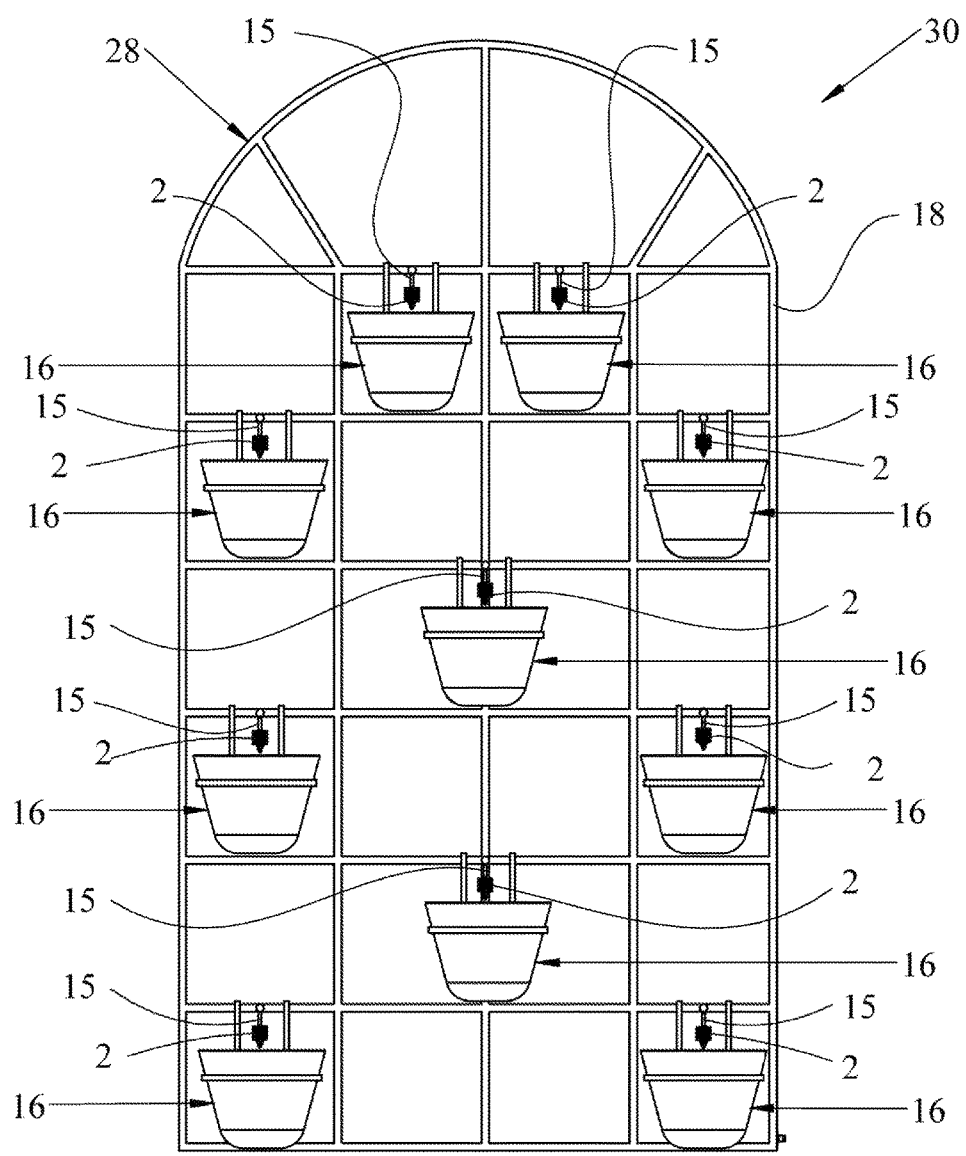
FIG. 15 is substantially a perspective view of a fully assembled self-contain plant watering apparatus depicted in a trellis garden planter, of the present invention.
Figure 16:
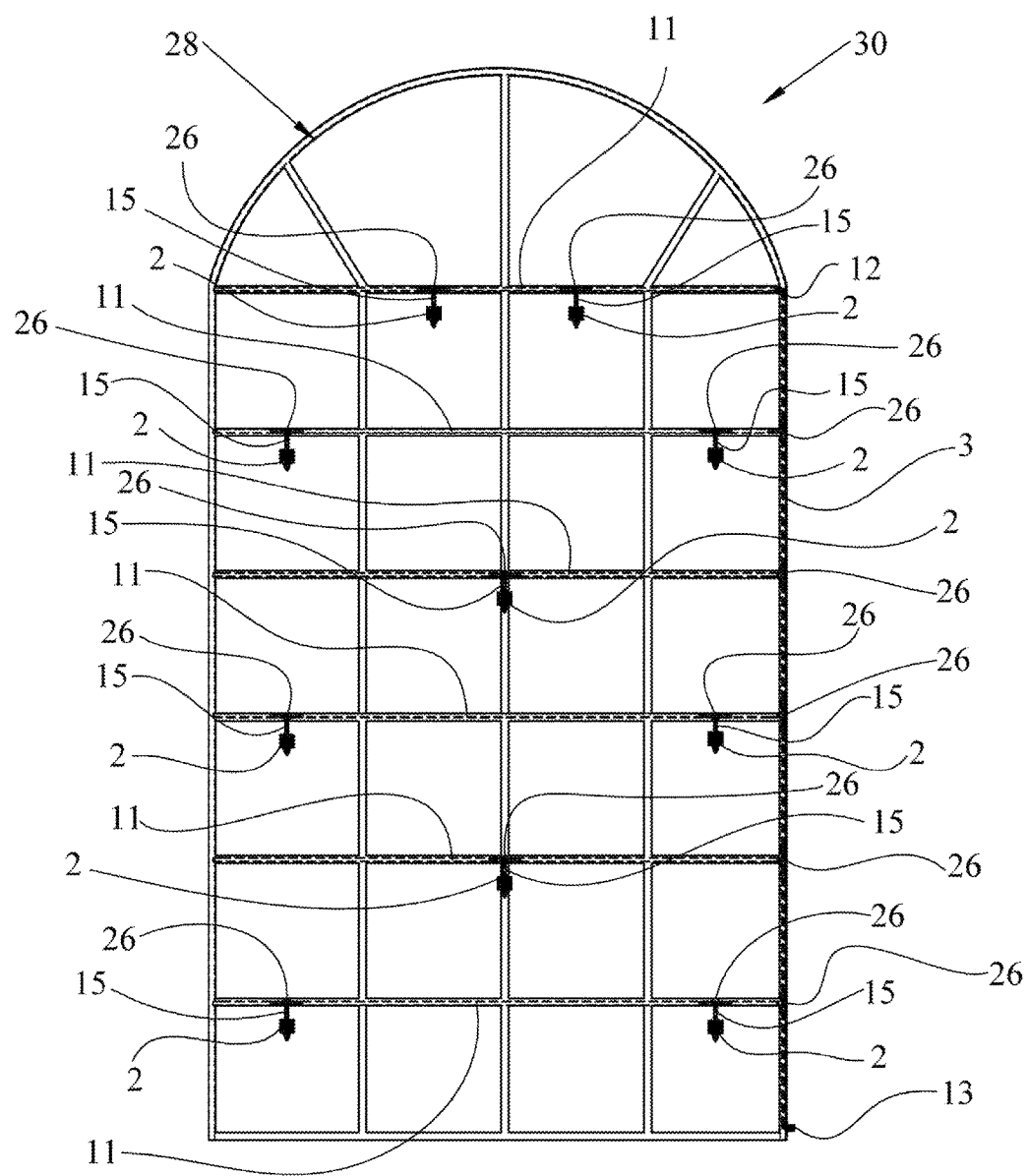
FIG. 16 is a cut-a-way view of the self-contain plant watering apparatus depicted in a trellis garden planter, according to a preferred embodiment of the invention.
Figure 17:
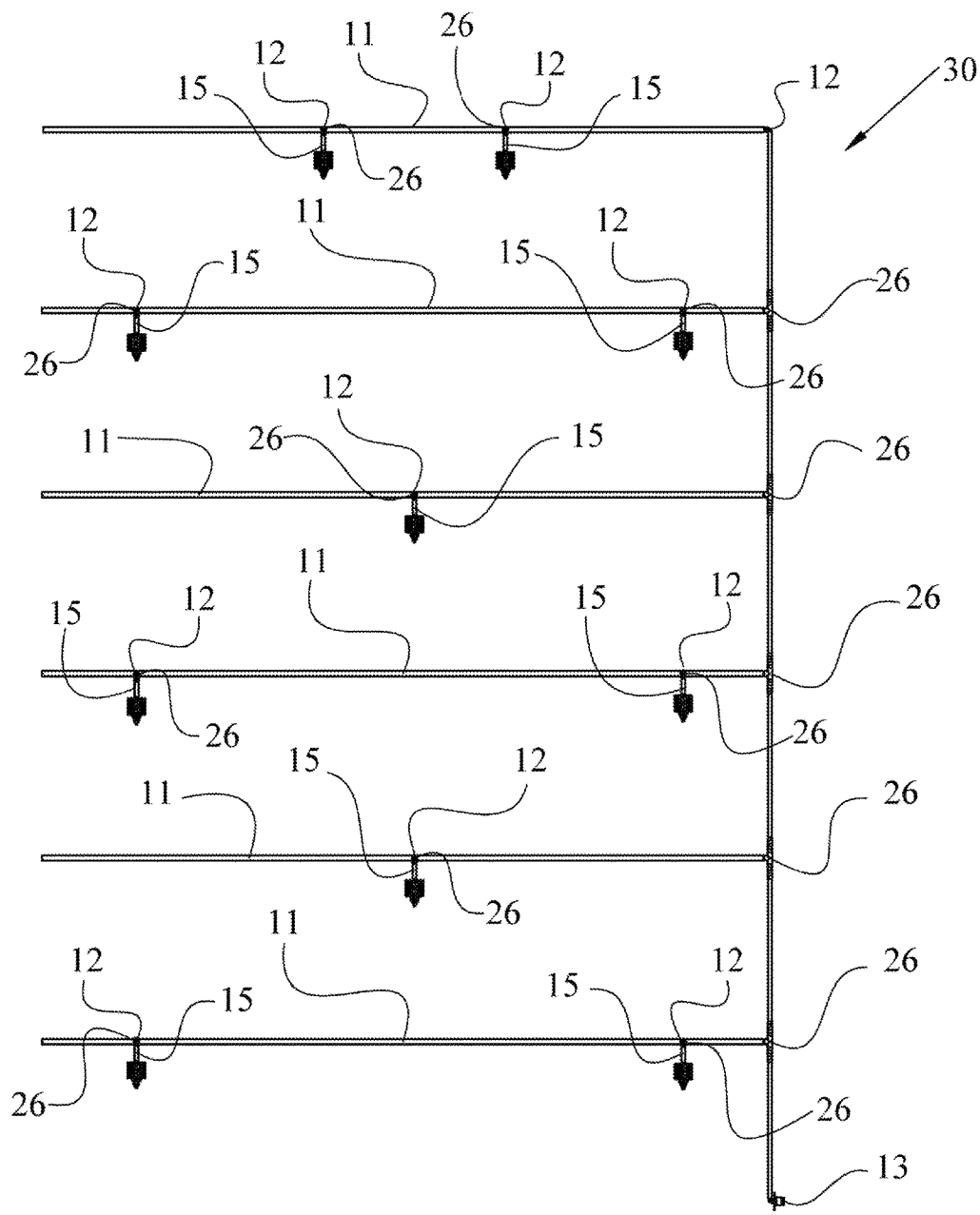
FIG. 17 is an perspective view of the self-contain plant watering apparatus system according to the preferred embodiment in accordance with the invention.

As substantially shown in FIG. 13, and referring to FIG. 12 a cut-a-way view of the self-contain watering network apparatus (30) within the wood post structure (22) connecting the quick disconnect fitting (13), to the main water tube (3) up the brass tubing (21). Also includes the main water tube connection to the water tube (11), a barbed fitting (12), to the drip tube (15), and then the water emitter (2). As substantially shown in FIG. 14, is an isometric view of the self-contain watering network apparatus (30) without the wood post planter, including the quick disconnect fitting (13), to the main water tube (3), to the barbed cross fitting (27), connecting the water tube (11), a barbed fitting (12), to the drip tube (15). Continuing to connect the main water tube (3), to the barbed tee fitting (26), and to the water tube (11), a barbed fitting (12), to the drip tube (15). As generally shown in FIG. 15, such a self-contain watering network system 30 depicted in a trellis garden screen (28) shown with plant holder (16), and a water emitter (2) connected to a drip tube (15). Also includes square steel tubing (18). As substantially shown in FIG. 16, and referring to FIG. 15 a cut-a-way view of the self-contain watering network apparatus (30) within the trellis garden planter (28) connecting the quick disconnect fitting (13), to the main water tube (3), thought out the square steel tubing (18). Also includes the main water tube (3), connected to the barbed tee fitting (26), connecting the water tube (11), a barbed fitting (12), to the drip tube (15) and then the water emitter (2). As substantially shown in FIG. 17, is an perspective view of the self-contain watering network apparatus (30) without the trellis garden planter, including the quick disconnect fitting (13), to the main water tube (3), to the barbed tee fitting (26), connecting the water tube (11). Also include connecting a barbed tee fitting (26), water tube (11), a barbed fitting (12), to the drip tube (15). In addition, connect the main water tube (3), to the barbed fitting (12), and to the water tube (11), a barbed fitting (12), to the drip tube (15).

CONCLUSION

Self-contain plant watering apparatus system depicted in a shepherd's hook, whiskey barrel planter, wood post planter and trellis garden planter for the purpose of watering plants on a regulator bases while keeping the apparatus attractiveness in tack. Includes a quick disconnect fitting for easy hookup of any watering drip system is disclosed. It is an object of the present invention to provide an improved plant watering system which can be easily hook up and provide a regulator flow of water to any type of plant.

What is claimed is:

1. A self-contained plant watering apparatus system comprising:
   A) a structure having a tubular passageway formed from square steel tubing, a flexible hose, a barbed fitting and a quick disconnect fitting, each of the barbed fitting and the quick disconnect fitting being partially located within the tubular passageway of the structure and connected via the flexible hose;

B) the flexible hose is threaded through the tubular passageway of the structure and the barbed fitting is part of an upper elbow male to male fitting connected and supported partially within the structure and the quick disconnect fitting is a lower quick disconnect hose fitting that is configured to be connected to a water source;

C) a drip emitter attached to the barbed fitting by attaching the barbed fitting into the drip emitter, a nozzle is attached to the drip emitter in a position to dispense water to a plant by a drip irrigation method, the lower end quick disconnect fitting is connected to the water source.

2. The system of claim 1, wherein the structure of the system is the form of a shepherd's hook and includes a planter and/or plant hanger, a square tube support bracket, a square steel ground stake and a top steel cap.

3. The system of claim 1, wherein the structure of the system is in the form of a whiskey barrel planter and includes a whiskey barrel/planter supported by a square steel support bracket, including within the structure is the connection of the barbed fitting to the drip tube connected to the drip emitter located above the whiskey barrel.

4. The system of claim 1, wherein the structure of the system is in the form of a trellis garden planter that includes a vertical and horizontal matrix system.

\* \* \* \* \*